(12) United States Patent
Liu et al.

(10) Patent No.: US 10,466,495 B2
(45) Date of Patent: Nov. 5, 2019

(54) SPATIAL LIGHT MODULATOR AND DISPLAY DEVICE

(71) Applicant: SHANGHAI TIANMA MICRO-ELECTRONICS CO., LTD., Shanghai (CN)

(72) Inventors: Yaoyang Liu, Shanghai (CN); Jian Xu, Shanghai (CN)

(73) Assignee: SHANGHAI TIANMA MICRO-ELECTRONICS CO., LTD., Shanghai (CN)

( * ) Notice: Subject to any disclaimer, the term of this patent is extended or adjusted under 35 U.S.C. 154(b) by 66 days.

(21) Appl. No.: 15/889,211

(22) Filed: Feb. 6, 2018

(65) Prior Publication Data

US 2018/0180897 A1 Jun. 28, 2018

(30) Foreign Application Priority Data

Oct. 24, 2017 (CN) .......................... 2017 1 0999732

(51) Int. Cl.
| | | |
|---|---|---|
| *G02B 26/06* | (2006.01) | |
| *G02B 26/08* | (2006.01) | |
| *G02F 1/1343* | (2006.01) | |
| *G02B 27/10* | (2006.01) | |

(52) U.S. Cl.
CPC ..... *G02B 27/1026* (2013.01); *G02B 26/0858* (2013.01); *G02F 1/1343* (2013.01)

(58) Field of Classification Search
CPC .... G02B 26/06; G02B 26/0858; G02B 26/08; G02B 5/1861; G02B 27/1026; G02F 1/1343; G02F 2203/12

USPC .......................................... 359/295, 291, 290
See application file for complete search history.

(56) References Cited

U.S. PATENT DOCUMENTS

| | | | |
|---|---|---|---|
| 9,299,909 B2 * | 3/2016 | Galler | ................. H01L 41/0533 |
| 2005/0046921 A1 * | 3/2005 | Govil | ................. G02B 26/0858 |
| | | | 359/291 |

FOREIGN PATENT DOCUMENTS

| | | |
|---|---|---|
| CN | 1292102 A | 4/2001 |
| CN | 1651968 A | 8/2005 |
| CN | 1830098 A | 9/2006 |
| CN | 103210514 A | 7/2013 |

* cited by examiner

*Primary Examiner* — Ryan D Howard
(74) *Attorney, Agent, or Firm* — Kilpatrick Townsend & Stockton, LLP (57) ABSTRACT

Disclosed are a spatial light modulator and a display device. The spatial light modulator includes: a substrate; the phase modulation devices disposed on a side of the substrate and arranged in an array, and each of the plurality of phase modulation devices includes a plurality of electrodes, the plurality of electrodes includes at least one first electrode and at least one second electrode, the at least one first electrode and the at least one second electrode are alternately arranged in a direction departing from the substrate, and a piezoelectric layer is sandwiched between the first electrode and the second electrode; and the piezoelectric layer comprises a piezoelectric material.

15 Claims, 12 Drawing Sheets

SPATIAL LIGHT MODULATOR AND DISPLAY DEVICE

CROSS-REFERENCE TO RELATED APPLICATIONS

This application claims priority to Chinese Patent Application No. CN201710999732.X, filed on Oct. 24, 2017 and entitled "SPATIAL LIGHT MODULATOR AND DISPLAY DEVICE", the disclosure of which is incorporated herein by reference in its entirety.

TECHNICAL FIELD

The present disclosure relates to the field of display technologies, and in particular, to a spatial light modulator and a display device.

BACKGROUND

In the display field, a precise modulation of light is always required. The modulation includes, but not limited to, a propagation direction, an amplitude, a phase and a polarization. The amplitude (or the light intensity) can be modulated by the combination of a liquid crystal and a polarizer. The polarization can generally be modulated by a half-wave plate or a quarter-wave plate. The phase can generally be modulated by controlling an optical path difference by a spatial light modulator.

Currently, a Liquid Crystal on Silicon (LCoS) spatial light modulator (LCoS-SLM for short) is generally used to modulate the phase. Like ordinary liquid crystal displays, the principle of LCoS-SLM is to rely on the modulation by liquid crystal molecules to the phase of light, so that the rotational speed of the liquid crystal molecules determines the response time of the LCoS-SLM. The rotational speed of the liquid crystal molecules is slow, and hence LCoS-SLM always has a long response time.

SUMMARY

The present disclosure provides a spatial light modulator and a display device to reduce the response time of the spatial light modulator.

Embodiments of the present invention provide a spatial light modulator, and the spatial light modulator includes: a substrate; and a plurality of phase modulation devices disposed on a side of the substrate and arranged in an array. Each of the plurality of phase modulation devices includes a plurality of electrodes. The plurality of electrodes include at least one first electrode and at least one second electrode. The at least one first electrode and the at least one second electrode are alternately arranged in a direction departing from the substrate. A piezoelectric layer is sandwiched between the first electrode and the second electrode. The piezoelectric layer includes a piezoelectric material.

Embodiments of the present invention further provide a display device, which includes a spatial light modulator, a light source, and a filter. The spatial light modulator includes a substrate and a plurality of phase modulation devices disposed on a side of the substrate and arranged in an array. Each of the plurality of phase modulation devices includes a plurality of electrodes. The plurality of electrodes include at least one first electrode and at least one second electrode. The at least one first electrode and the at least one second electrode are alternately arranged in a direction departing from the substrate. A piezoelectric layer is sandwiched between the first electrode and the second electrode. The piezoelectric layer includes a piezoelectric material. The spatial light modulator is located at a side of the filter away from the light source. Light emitted by the light source passes through the filter and then irradiates onto the spatial light modulator. The spatial light modulator is configured to modulate a phase of the light irradiating thereon.

Embodiments of the present invention provide a spatial light modulator, which includes a substrate and a plurality of phase modulation devices on a side of the substrate. The phase modulation device includes at least one first electrode and at least one second electrode alternately arranged in a direction departing from the substrate. A piezoelectric layer is sandwiched between the first electrode and the second electrode, where the piezoelectric layer includes a piezoelectric material. A length of the piezoelectric material in a direction perpendicular to the substrate can be changed with the change in the intensity of an electric field applied by the first electrode and the second electrode, thereby changing the optical path of the light irradiating onto the phase modulation device to modulate a phase of the incident light by the spatial light modulator. In the embodiments of the present invention, the piezoelectric material is used instead of liquid crystal molecules to achieve the phase modulation of the incident light, and the response speed of the piezoelectric material is superior to that of the liquid crystal molecules. Therefore, when comparing to the Lcos-SLM, the spatial light modulator provided in the embodiments of the invention largely reduces the response time.

DETAILED DESCRIPTION

The present disclosure will be further described in detail below with reference to the accompanying drawings and embodiments. It can be understood that the embodiments described herein are only used to explain, rather than limiting, the present disclosure. In addition, it should also be noted that, for the convenience of description, only some but not all parts related to the present disclosure are shown in the accompanying drawings.

Figure 1:
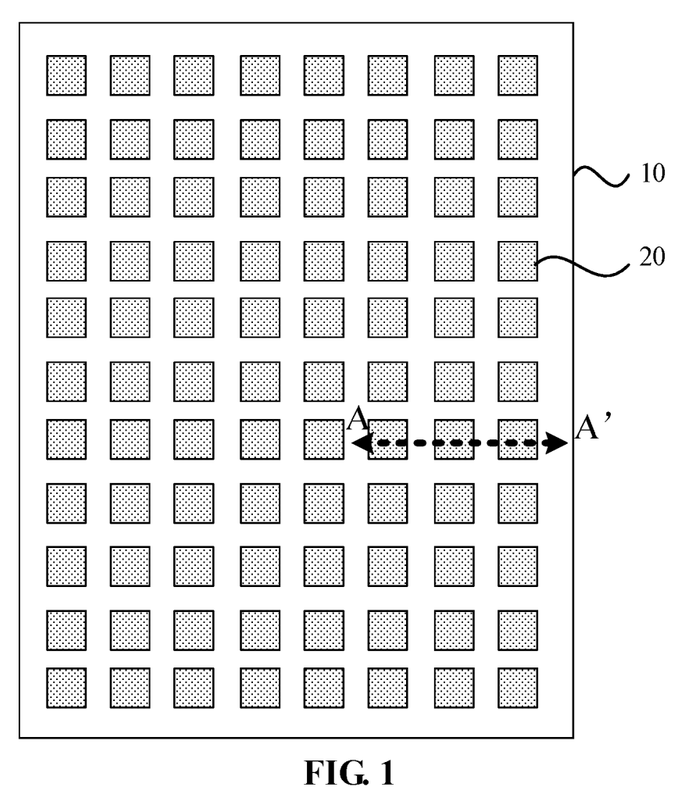
FIG. 1 is a schematic top view of a spatial light modulator according to an embodiment of the present invention.
Figure 2:
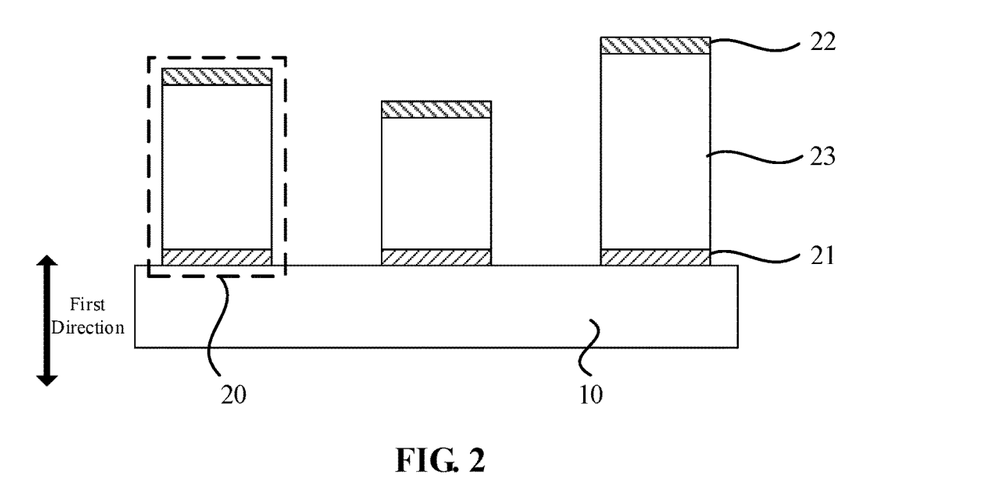
FIG. 2 is a cross-sectional structural diagram of the spatial light modulator along AA' direction in FIG. 1.

FIG. 1 is a schematic top view of a spatial light modulator according to an embodiment of the present invention. FIG. 2 is a cross-sectional structural diagram of the spatial light modulator along AA' direction in FIG. 1. As shown in FIG. 1 and FIG. 2, a spatial light modulator includes a substrate 10 and a plurality of phase modulation devices 20 disposed on a side of the substrate 10 and arranged in an array. It should be noted that the phase modulation devices 20 shown in FIG. 1 are arranged in a matrix, and all the phase modulation devices 20 have the same size. That is, the vertical projections of all the phase modulation devices 20 on the substrate 10 has the same area, which is merely a type of distribution manners of a typical phase modulation device 20 provided in the embodiment of the present invention. In other embodiments, the spatial light modulator may include a plurality of phase modulation devices 20 having different sizes, and the plurality of phase modulation devices 20 may also be arranged in other array forms (e.g., a ring arrangement) rather than a matrix. Each of the phase modulation devices 20 sequentially includes a first electrode 21, a piezoelectric layer 23 and a second electrode 22 in a direction departing from the substrate 10. The piezoelectric layer 23 includes a piezoelectric material. When different voltages are applied on the first electrode 21 and the second electrode 22, the piezoelectric material would be mechanically deformed in a first direction under the excitation electric field generated by the first electrode 21 and the second electrode 22, where the first direction is a direction perpendicular to a plane of the substrate 10. The piezoelectric material may be a piezoelectric single crystal, a piezoelectric polycrystalline ceramic or an organic piezoelectric material. In an embodiment, the piezoelectric material may be quartz single crystal, lanthanum-doped lead zirconate titanate (PLZT) ceramic or barium titanate ceramic.

The phase modulation device 20 shown in FIG. 2 includes a first electrode 21, a second electrode 22, and a piezoelectric layer 23. A change in the length of the piezoelectric material in the first direction has a positive correlation with the intensity of the electric field (formed by the first electrode 21 and the second electrode 22). That is, the greater the voltage difference between the first electrode 21 and the second electrode 22 is, the greater the change of the length of the piezoelectric material in the piezoelectric layer 23 along the first direction is. Therefore, if a change in the length of the phase modulation device 20 in the first direction may be necessary to reach a certain threshold, the first electrode 21 and the second electrode 22 may need to generate a sufficiently large voltage difference. In order to reduce the voltage difference between the first electrode and the second electrode but the amount of change in the length of the phase modulation device in the first direction reaches a certain threshold, in other embodiments of the present invention, the arrangement is employed in such a way that the first electrode, the piezoelectric layer, the second electrode, the piezoelectric layer and the first electrode, etc., are stacked.

Figure 3:
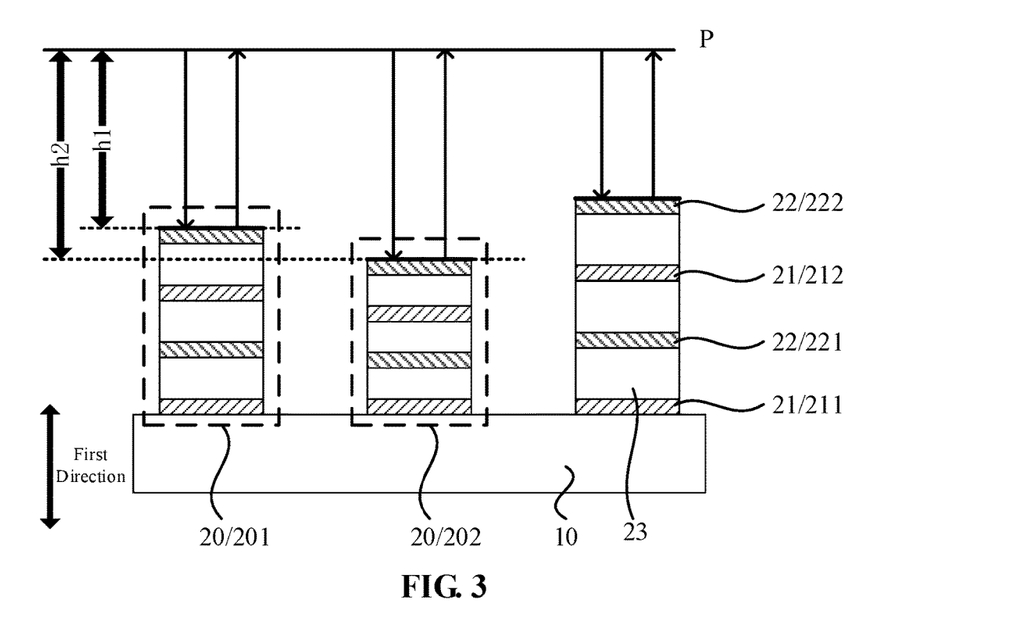
FIG. 3 is a cross-sectional structural diagram of another spatial light modulator according to an embodiment of the present invention.

FIG. 3 is a cross-sectional structural diagram of another spatial light modulator according to an embodiment of the present invention. Referring to FIG. 1 and FIG. 3, each of the phase modulation devices 20 includes a plurality of electrodes. The electrodes include at least one first electrode 21 and at least one second electrode 22. The first electrode 21 may be a cathode electrode/anode electrode, and the second electrode 22 may be an anode electrode/cathode electrode. The at least one first electrode 21 and the at least one second electrode 22 are alternately arranged along the direction departing from the substrate 10. The piezoelectric layer 23 is sandwiched between the first electrode 21 and the second electrode 22. FIG. 3 exemplarily shows that one phase modulation device 20 includes two first electrodes 21 and two second electrodes 22, which is not limited in the present disclosure. In other embodiments, one phase modulation device 20 may include at least three first electrodes 21 and at least three second electrodes 22. The number of the first electrodes 21 may be equal to the number of the second electrodes 22, the number of the first electrodes 21 may be one more than the number of the second electrodes 22, or the number of the second electrodes 22 may be one more than the number of the first electrodes 21.

For the sake of clarity, the first electrodes 21 and the second electrodes 22 are further redefined respectively in the embodiments of the present invention. Specifically, the first electrodes 21 include a first first electrode 211 and a second first electrode 212. The second electrodes 22 include a first second electrode 221 and a second second electrode 222. A first voltage, a second voltage, a third voltage and a fourth voltage are applied on the first electrode 211, the first second electrode 221, the second first electrode 212 and the second second electrode 222, respectively. For any one of the phase modulation devices 20, the voltage values of the first voltage and the third voltage thereof may be the same with or different from each other, and the voltage values of the second voltage and the fourth voltage thereof may be the same with or different from each other. For the different phase modulation devices 20, the first voltages, the second voltages, the third voltages and the fourth voltages of the different phase modulation devices 20 may be different from each other, respectively, and each of the phase modulation devices 20 independently receives a control from the electrical signal and changes the phase of the light received in the space.

Exemplarily, when the spatial light modulator as shown in FIG. 2 is used, if the change in the length of the phase modulation device 20 in the first direction reaches the threshold T, the voltage difference between the first electrode 21 and the second electrode 22 may need to be 15V. When the spatial light modulator as shown in FIG. 3 is used, if change in the length of the phase modulation device 20 in the first direction reaches the threshold T, since the change in the length of the piezoelectric material in the first direction is positively correlated with the intensity of the electric field, that the voltage difference between the first first electrode 211 and the first second electrode 221 is 5V, the voltage difference between the first second electrode 221 and the second first electrode 212 is 5V, and the voltage difference between the second first electrode 212 and the second second electrode 222 is 5V, thereby reducing the voltage difference between the first electrode 21 and the second electrode 22.

The embodiments of the present invention provide a spatial light modulator, which includes a substrate and a plurality of phase modulation devices on a side of the substrate. The phase modulation device includes the first electrode and the second electrode alternately arranged in a direction departing from the substrate. A piezoelectric layer is sandwiched between the first electrode and the second electrode, and the piezoelectric layer includes a piezoelectric material. A length of the piezoelectric material in a direction perpendicular to the substrate is changed with the change in the intensity of an electric field applied by the first electrode and the second electrode, thereby changing the optical path of the light incident onto the phase modulation device to achieve a phase modulation of the incident light by the spatial light modulator. If light travels a distance h in a medium having a refractive index n, the corresponding optical path L satisfies: L=n*h, and the corresponding relationship between the phase ψ and the optical path L is:

$$\psi = \frac{2\pi}{\lambda} L,$$

where λ is the wavelength of the light. In the embodiments of the present invention, the piezoelectric material is used instead of liquid crystal molecules to achieve the phase modulation of the incident light, and the response speed of the piezoelectric material is superior to that of the liquid crystal molecules. Therefore, if comparing to the Lcos-SLM, the spatial light modulator provided in the embodiments of the invention reduces the response time.

Referring to FIG. 3, a thin solid arrow direction indicates a light propagation direction, and for the sake of clarity, the incident light perpendicularly incident on the surface of the second electrode 22 and the reflected light reflected by the second electrode 22 are separately shown in the Figures. Actually, the reflected light reflected by the second electrode 22 should be the one which is reflected back along the path of the incident light perpendicularly incident on the surface of the second electrode 22. In addition, a reflective surface (i.e., a side where light is reflected) of the reflective electrode (referring to an electrode having a reflective characteristic) is also shown in bold in the figures. Each phase modulation device 20 includes a plurality of electrodes (which include a first electrode 21 and a second electrode 22). The electrode farthest from the substrate 10 is the reflective electrode. That is, the second electrode 22 farthest from the substrate 10 is the reflective electrode. The spatial light modulator is a reflective spatial light modulator. The reflective electrode can be made of a single layer, for example, can be made of a metal material with good reflectivity. The reflective electrode may also be made of a multilayer material, for example, a laminating material of indium tin oxide and a metal reflective layer. It can be understood that compared to a multilayer material, a single layer material can save the manufacturing process of the reflective electrode and reduce the manufacturing cost.

Figure 4:
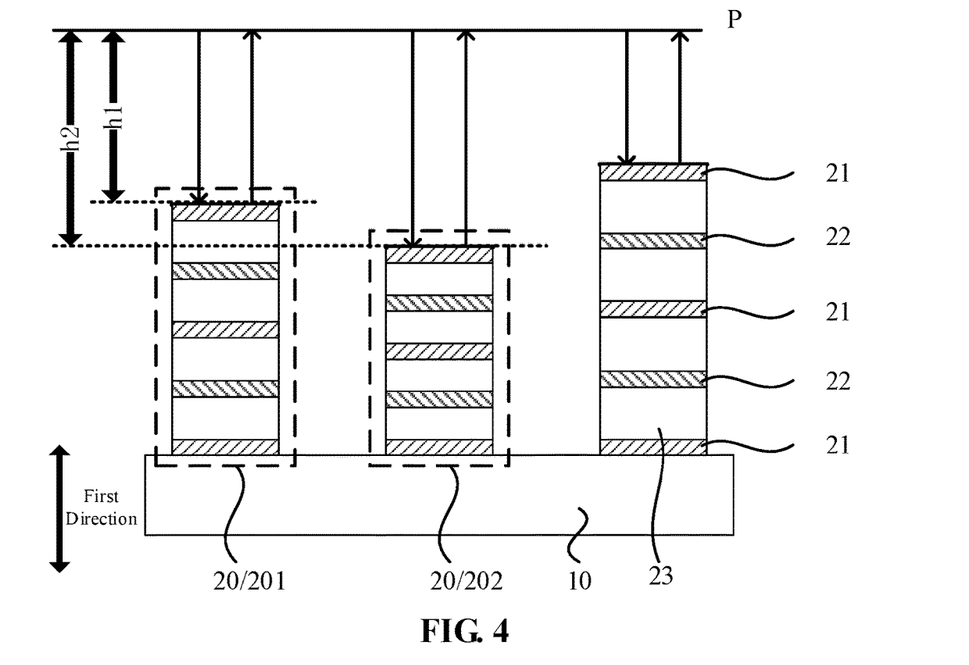
FIG. 4 is a cross-sectional structural diagram of another spatial light modulator according to an embodiment of the present invention.

FIG. 4 is a schematic cross-sectional structure of another spatial light modulator according to an embodiment of the present invention. The difference between FIG. 4 and FIG. 3 lies in that in FIG. 4, the number of the first electrodes 21 is one more than the number of the second electrodes 22. The electrode (including the first electrode 21 and the second electrode 22) closest to the substrate 10 is one first electrode 21, and the electrode farthest from the substrate 10 is also one first electrode 21. In this case, the electrode farthest from the substrate 10 is a reflective electrode, that is, the first electrode 21 farthest from the substrate 10 is a reflective electrode.

Figure 5:
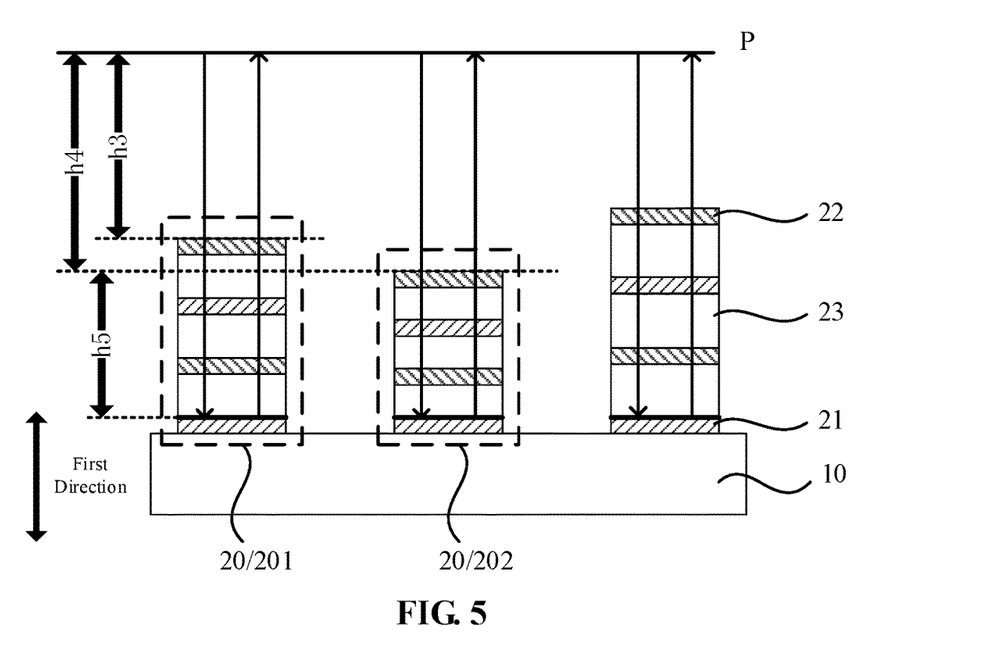
FIG. 5 is a cross-sectional structural diagram of another spatial light modulator according to an embodiment of the present invention.

FIG. 5 is a schematic cross-sectional structure diagram of another spatial light modulator according to an embodiment of the present invention. The difference between FIG. 5 and FIG. 3 lies in that, the reflective electrode of the spatial light modulator shown in FIG. 5 is a first electrode closest to the substrate. As shown in FIG. 5, a thin solid arrow direction indicates the light propagation direction, and each phase modulation device 20 includes N first electrodes 21 (N is set to be 2 schematically in FIG. 5), where the first electrode 21 closest to the substrate 10 is a reflective electrode. The N−1 first electrodes 21 other than the reflective electrode are transparent electrodes. The transparent electrode here refers to an electrode with light transmission characteristic. For example, the transparent electrode may be made of an indium tin oxide (ITO) or a carbon nanotube. Also, each of the second electrodes 22 is a transparent electrode and the piezoelectric layer 23 is a transparent piezoelectric layer. Therefore, the incident light incident onto the surface of the first electrode 21 along the first direction and the reflected light reflected by the first electrode 21 can not only pass through the air but also pass through N−1 first electrodes 21, N second electrodes 22 and the piezoelectric layer 23. As known, the major concern on the use of the spatial light modulator to phase modulation of the incident light lies in that the beams of incident light have different phase delays in different spatial parts. That is, the light rays corresponding to the different phase modulation devices 20 have different optical paths. In the embodiments of the present invention, light rays corresponding to different phase modulation devices 20 all pass through the N−1 first electrodes 21 and N second electrodes 22, so that the affection on the phase of the incident light by the first electrodes 21 and the second electrode 22 does may not need to be considered, and hence only the affection of the length change of the piezoelectric layer 23 in the first direction on the phase of the incident light may need to be considered.

Exemplarily, with reference to FIG. 3 and FIG. 5, for the sake of clarity, the embodiments of the present invention further redefine the marking of the phase modulation device 20. Specifically, the phase modulation device 20 includes a first phase modulation device 201 and a second phase modulation device 202. Referring to FIG. 3, parallel light is incident perpendicularly (incident in the first direction) onto the spatial light modulator. As mentioned above, the major concern on the use of the spatial light modulator to the phase modulation of the incident light lies in that, the beams of the incident light have different phase delays in different spatial parts, so that a reference plane P can be chosen arbitrarily (the isophase plane of the parallel light is a plane, and thus the selected reference plane P is also the isophase plane of the parallel light), and the optical path of the light ray of the parallel light corresponding to the first phase modulation device 201 is L1=2*n1*h1 where n1=1 and is a refractive index of the air, h1 is a distance between one end of the first phase modulation device 201 away from the substrate 10 and the reference plane P. The optical path of the light ray of the parallel light corresponding to the second phase modulation device 202 is L2=2*n1*h2, where h2 is a distance between the end of the second phase modulation device 202 away from the substrate 10 and the reference plane P. The optical path difference between the optical path of the light ray of the parallel light corresponding to the first phase modulation device 201 and that corresponding to the second phase modulation device 202 is ΔL1=|L1−L2|=2*n1*(h2−h1). Each of the phase modulation devices 20 independently receive the control from the electrical signal, and thus different voltages can be applied to the first phase modulation device 201 and the second phase modulation device 202 so as to enable the first phase modulation device 201 and the second phase modulation device 202 to have different lengths in the first direction, so that the distance between one end of the first phase modulation device 201 away from the substrate 10 and the reference plane P is enabled to be equal to h1 and the distance between one end of the second phase modulation device 202 away from the substrate 10 and the reference plane P is enabled to be equal to h2. The similar contents between FIG. 5 and FIG. 3 are not discussed again here for the purpose of brevity. Referring to FIG. 5, the optical path of the light ray of the parallel light corresponding to the first phase modulation device 201 is: $L3=2*[(h4+h5-h3)*n2+h3*n1]$, where h3 is a distance between the one end of the first phase modulation device 201 away from the substrate 10 and the the reference plane P, h4 is a distance between one end of the second phase modulation device 202 away from the substrate 10 and the reference plane P and h5 is a distance between one end of the second phase modulation device 202 close to the substrate 10 and the reference plane P (the thicknesses of the first electrode 21 and the second electrode 22 are negligible when considering the thickness of the piezoelectric layer 23). The optical path of the light ray of the parallel light corresponding to the second phase modulation device 202 is $L4=2*(h5*n2+h4*n1)$. The optical path difference between the optical path of the light ray of the parallel light corresponding to the first phase modulation device 201 and the optical path of the light ray of the parallel light corresponding to the second phase modulation device 202 is: $\Delta L2=|L3-L4|=2*(n2-n1)*(h4-h3)=2*(n2-1)*(h4-h3)$. In the case of h1=h3 and h2=h4, when n2>2, $\Delta L2>\Delta L1$. Hence, compared to the spatial light modulator shown in FIG. 3, the spatial light modulator shown in FIG. 5 is more likely to generate a large phase difference in the case that the refractive index of the piezoelectric material is greater than 2. That is, for a particular phase modulation requirement criterion, the piezoelectric layer 23 in the spatial light modulator shown in FIG. 5, compared to that in FIG. 3, may have in a smaller length in the first direction, which is favorable to reducing the thickness and weight of the spatial light modulator.

It should be noted that when all the phase modulation devices 20 in the spatial light modulator are not affected by the electric field (that is, when there is no voltage difference between the first electrode 21 and the second electrode 22 to generate an electric field), all the phase modulation devices 20 have the same height, and then the sides of all the phase modulation devices 20 away from the substrate 10 can be selected as the reference plane P. Then for any of the phase modulation devices 20, the change amount of the length of the phase modulation device can be obtained according to the values for the voltages applied to the plurality of first electrodes 21 and the plurality of second electrodes 22 thereof.

Figure 6:
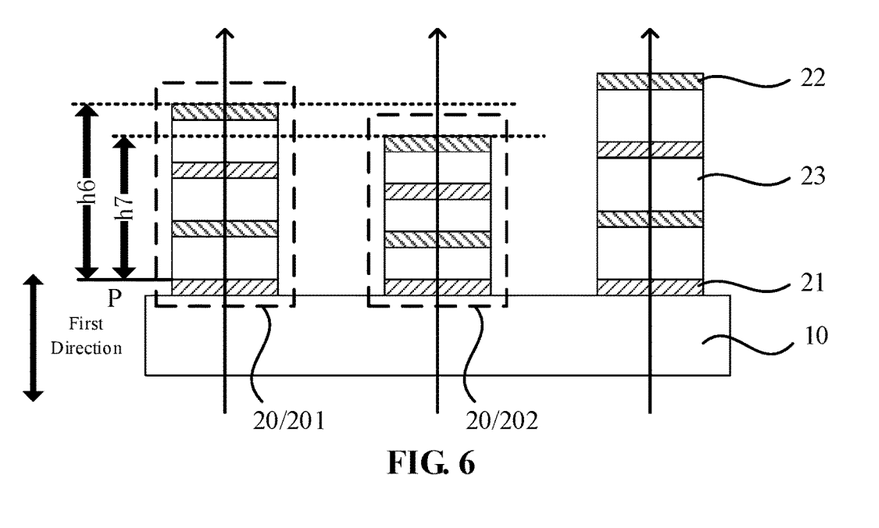
FIG. 6 is a cross-sectional structural diagram of another spatial light modulator according to an embodiment of the present invention.

FIG. 6 is a schematic cross-sectional structure diagram of another spatial light modulator according to an embodiment of the present invention. The difference of FIG. 6 from FIG. 3 and FIG. 5 lies in that the spatial light modulator shown in FIG. 6 is a transmissive spatial light modulator. As shown in FIG. 6, the thin solid arrow direction indicates the light propagation direction. The first electrode 21 and the second electrode 22 both are transparent electrodes. The piezoelectric layer is a transparent piezoelectric layer, and the substrate 10 is a transparent substrate. The parallel light is perpendicularly incident on a side of the substrate 10, passes through the substrate 10 and the phase modulation device 20 located on the substrate 10, and then still propagates along a direction in which the light propagates before irradiating onto the spatial light modulator. The optical path of the light ray of the parallel light corresponding to the first phase modulation device 201 is $L5=n2*h6$, where h6 is a distance from one end of the first phase modulation device 201 away from the substrate 10 to the reference plane P. The optical path of the light ray of the parallel light corresponding to the second phase modulation device 202 is $L6=n1*(h6-h7)+n2*h7$, where h7 a distance between one end of the second phase modulation device 202 away from the substrate 10 and the reference plane P. The optical path difference between the optical path of the light ray of the parallel light corresponding to the first phase modulation device 201 and that corresponding to the second phase modulation device 202 is: $\Delta L3=|L5-L6|=(n2-n1)*(h6-h7)$.

It should be noted that, in the above embodiments, the example shows that the parallel light is perpendicularly incident on the spatial light modulator, but it is not intended to limit the present disclosure. In other embodiments, the parallel light may be incident on the light incidence surface of the spatial light modulator at a certain angle or non-parallel light may be incident on the spatial light modulator. In one embodiment, the beams of the light can be selected according to product requirements and would not affect the spatial light modulator.

Figure 7:
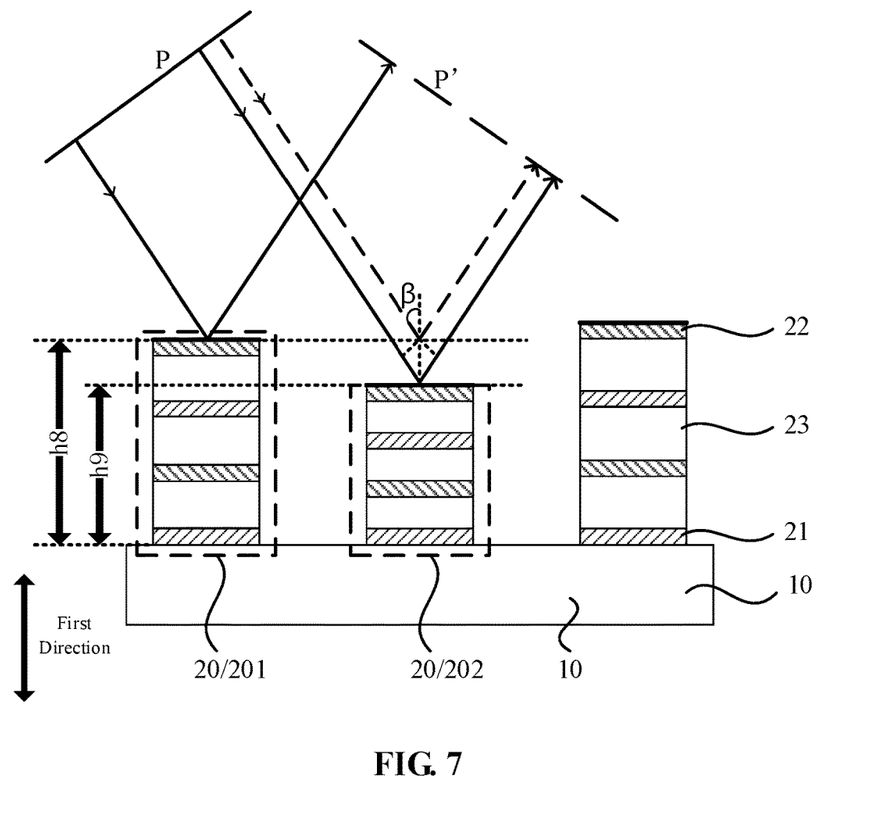
FIG. 7 is a schematic diagram of the spatial light modulator where light is incident at an inclination angle according to an embodiment of the present invention.

FIG. 7 is a schematic diagram of the spatial light modulator where light is incident at an inclination angle according to an embodiment of the present invention. Unlike normal incidence of the incident light on the spatial light modulator shown in FIG. 3, the incident light in FIG. 7 is incident on the spatial light modulator at an incident angle β which is the angle between the incident light and the line perpendicular to the light incidence surface of the spatial light modulator. As shown in FIG. 7, the thin solid arrow direction indicates the light propagation direction, and the thin broken arrow direction indicates a direction of an equivalent light ray of the light ray of the parallel light corresponding to the first phase modulation device 201. In order to understand that the configuration that "the optical path of the light ray of the parallel light corresponding to the first phase modulation device 201" is equivalent to the configuration that "the optical path of the equivalent light ray of the light ray of the parallel light corresponding to the first phase modulation device 201", in FIG. 7, an equal phase plane P' of the reflected light is also given. From FIG. 7, it is known that the optical path difference between the optical path of the light ray of the parallel light corresponding to the first phase modulation device 201 and that corresponding to the second phase modulation device 202 is $\Delta L4=2*(h8-h9)*\cos(\beta)$, where h8 is a distance between one end of the first phase modulation device 201 away from the substrate 10 and the surface of the base substrate close to the phase modulation device 20, and h9 is a distance between one end of the second phase modulation device 202 away from the substrate 10 and the surface of the base substrate close to the phase modulation device 20.

In an embodiment, the piezoelectric material of the reflective spatial light modulator shown in FIG. 5 and the transmissive spatial light modulator shown in FIG. 6 may include an organic piezoelectric material or a lanthanum-doped lead zirconate titanate (PLZT) ceramic, both of which are transparent. The piezoelectric material is a transparent piezoelectric material, so that the incident light on the reflective spatial light modulator shown in FIG. 5 and on the transmissive spatial light modulator shown in FIG. 6 would not be absorbed and lost. In one embodiment, the organic piezoelectric material may be a polar polymer material such as polyvinylidene fluoride (PVDF). The PLZT ceramic includes lanthanum-doped lead zirconate titanate having a chemical formula $Pb_{1-x}La_xZr_yTi_{1-y}O_3$, and the properties of the PLZT ceramic can be changed with a change in compositions of x and y.

Figure 8:
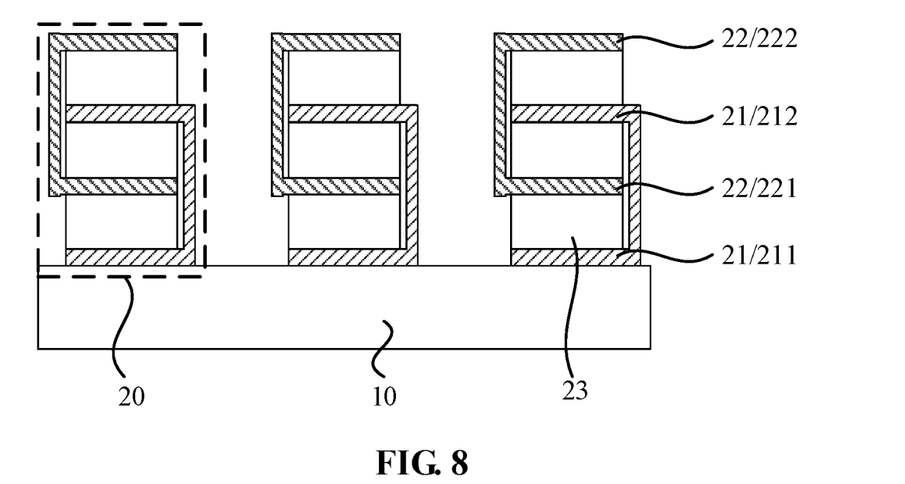
FIG. 8 is a cross-sectional structural diagram of another spatial light modulator according to an embodiment of the present invention.

FIG. 8 is a schematic cross-sectional structure of another spatial light modulator according to an embodiment of the present invention. The difference between FIG. 8 and FIG. 3 lies in that in each of the phase modulation devices 20 in FIG. 8, all the first electrodes 21 are connected with each other, and all the second electrodes 22 are connected with each other. Specifically, referring to FIG. 8, in each of the phase modulation devices 20, the first first electrode 211 is connected with the second first electrode 212, and the first second electrode 221 is connected with the second second electrode 222. Comparing with the spatial light modulator shown in FIG. 3, such arrangement that all the first electrodes are connected together and all the second electrodes are connected together can reduce the number of terminals of the driving chip for driving the plurality of first electrodes and the plurality of second electrodes, and reduce the number of signal lines connected to the plurality of first electrodes and the plurality of second electrodes.

Figure 9:
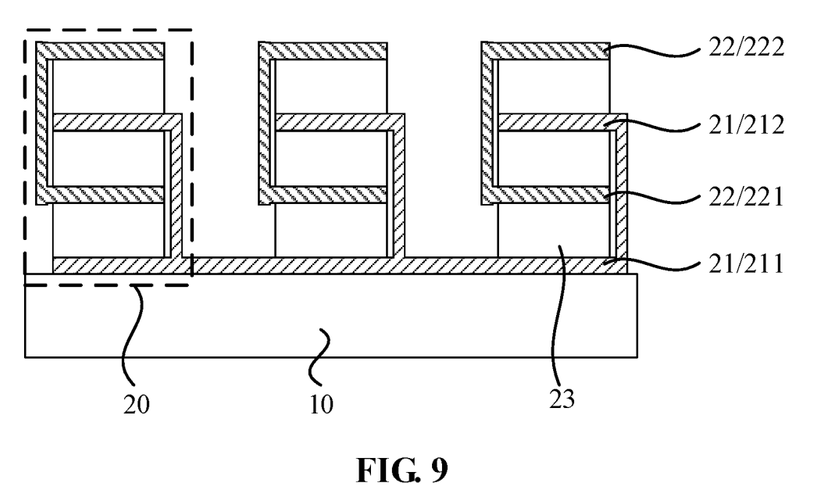
FIG. 9 is a cross-sectional structural diagram of another spatial light modulator according to an embodiment of the present invention.

FIG. 9 is a schematic cross-sectional structure diagram of another spatial light modulator according to an embodiment of the present invention. The difference between FIG. 9 and FIG. 8 lies in that in FIG. 9, the first electrodes 21 of the plurality of phase modulation devices 20 respectively closest to the substrate 10 are connected with each other, that is, the first electrode 21 of each of the phase modulation devices 20 closest to the substrate 10 is connected with the first electrodes 21 of the other of the phase modulation devices 20 closest to the substrate 10, so that the number of terminals of the driver chip and the number of signal lines can be further reduced. In an embodiment, all the first electrodes 21 of the plurality of spatial light modulators may be connected together. In this arrangement, all the first electrodes 21 have the same potential and may function as the common electrode. Then, the common electrode may also be grounded to provide a stable potential for all the first electrodes 21.

In addition, the spatial light modulator shown in FIG. 2 may be a reflective spatial light modulator or a transmissive spatial light modulator. For the reflective spatial light modulator, the first electrode 21 or the second electrode 22 may be selected as a reflective electrode. When the first electrode 21 is selected as a reflective electrode, a piezoelectric material having a refractive index greater than 2 may be selected to reduce the thickness and weight of the spatial light modulator.

Figure 10:
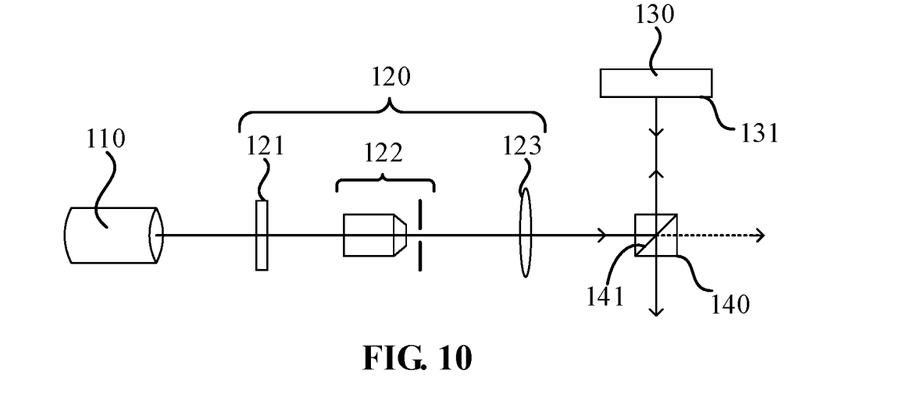
FIG. 10 is a schematic structural diagram of a display device according to an embodiment of the present invention.

Embodiments of the present invention further provide a display device, which includes the spatial light modulator in any one of the foregoing embodiments. FIG. 10 is a schematic structural diagram of a display device according to an embodiment of the present invention. Referring to FIG. 3 and FIG. 10, the display device includes a light source 110, a spatial light modulator 130 and a filter 120. The spatial light modulator 130 is located at a side of the filter 120 away from the light source 110. The light emitted by the light source 110 passes through the filter 120 and then irradiates onto the spatial light modulator 130. The spatial light modulator 130 is configured for modulating a phase of the light irradiating thereon. The spatial light modulator 130 includes a substrate 10 and a plurality of phase modulation devices 20 disposed on a side of the substrate 10 and arranged in an array. Each of the phase modulation devices 20 includes a plurality of electrodes, and the electrodes include at least one first electrode 21 and at least one second electrode 22. The first electrode 21 may be a cathode electrode/anode electrode, and the second electrode 22 may be an anode electrode/cathode electrode. The first electrode 21 and the second electrode 22 are alternately arranged in a direction departing from the substrate 10. A piezoelectric layer 23 is sandwiched between the first electrode 21 and the second electrode 22, and the piezoelectric layer 23 includes a piezoelectric material.

In an embodiment, the light source 110 may be a laser which emits coherent light. The filter 120 includes an attenuator 121, a spatial filtering plate 122 and a collimating lens 123. The filter 120 is used to filter out stray light and improve quality of the light beam. In other embodiments, the filter may include a beam expander and an aperture stop, depending on specific arrangements according to product requirements, which is not limited in the embodiments of the present invention. The light beam emitted by the light source 110 is firstly absorbed and attenuated by the attenuator 121 in order to reduce the intensity thereof. The spatial filtering plate 122 may include an objective lens and a small hole located at a focal point of the objective lens. Also, the small hole (that is, a type of aperture stops of which the aperture size is relatively small) in the spatial filtering plate 122 is also located at a focal point of the collimator lens 123. After passing through the focal point of the objective lens and irradiating onto the small hole, the light is emitted as a spherical wave, and passes through the collimating lens 123 to form the parallel light.

In selecting the mode of vertically irradiating onto a light incidence surface 131 (that is, the surface on which the light is incident) of the spatial light modulator 130, the display device generally further includes a beam splitter 140. The light incidence surface 131 of the spatial light modulator 130 is parallel to optical axes of the light source 110 and the filter 120, and is at angle 45° with respect to a transflective surface 141 (that is a semi-reflecting and semi-transmissive surface) of the beam splitter 140. The light emitted by the light source 110 irradiates onto the spatial light modulator 130 through the light incidence surface 131. The spatial light modulator 130 is a reflective spatial light modulator. The light emitted by the light source 110 is firstly filtered by the filter 120 and then irradiates onto the transflective surface 141 of the beam splitter 140, and then vertically irradiates onto the light incidence surface 131 of the spatial light modulator 130 after it is reflected by the transflective surface 141, and then again irradiates onto the beam splitter 140 in a direction perpendicular to the optical axes of the light source 110 and the filter 120 after it is reflected by the spatial light modulator 130, and then passes through the transflective surface 141 of the beam splitter 140 to still propagate in the direction perpendicular to the optical axes of the light source 110 and the filter 120. The beam splitter 140 can split a beam of light into two beams of light. For example, as shown in FIG. 10, light emitted from the collimating lens 123 irradiates onto the transflective surface 141 of the beam splitter 140 and are split as two beams of the light, where one beam of the light still propagate in the original propagation direction (as indicated by the dotted arrow in FIG. 10), and the other beams of the light is at a rotational angle 90° with respect to the original propagation direction and is perpendicularly incident onto the light incidence surface 131 of the spatial light modulator 130.

Figure 11:
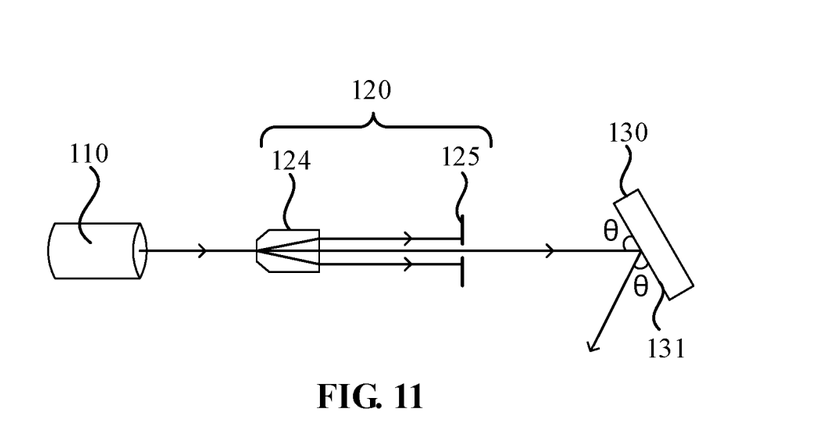
FIG. 11 is a schematic structural diagram of another display device according to an embodiment of the present invention.

FIG. 11 is a schematic structural diagram of another display device according to an embodiment of the present invention. The difference between FIG. 11 and FIG. 10 lies in that in this embodiment of the present invention, light is incident at an inclination angle on the light incidence surface of the spatial light modulator, as shown in FIG. 11. The angle θ between the light incidence surface 131 of the spatial light modulator 130 and the direction of the optical axes of the light source 110 and the filter 120 satisfies 0<θ<90°. The light emitted by the light source 110 radiates onto the spatial light modulator 130 through the light incidence surface 131, and the spatial light Modulator 130 is a reflective spatial light modulator. The light emitted from the light source 110 is filtered by the filter 120 and then irradiates on the spatial light modulator 130, and then is reflected in the direction which is at the angle θ with respect to the light incidence surface 131 to still propagate. With respect to the incident mode shown in FIG. 10, there may be no need to use the beam splitter, thereby saving the number of components and reducing costs. The filter 120 includes a beam expander lens 124 and an aperture stop 125. The beam expander 124 can expand a diameter of the light beam emitted from the light source 110. That is, the diameter of the light beam emitted from the beam expander 124 is larger than that incident on the beam expander 124. The aperture stop 125 is a barrier with apertures. A part of the light beam emitted from the beam expander 124 is shielded by the opaque part of the aperture stop, and the other part of the light beam emitted from the beam expander 124 passes through the aperture 125, and finally irradiates onto the light incidence surface 131 of the spatial light modulator 130. It can be understood that the filter in the embodiment of the present invention may also be implemented by an attenuator, a spatial filtering plate and a collimating lens instead of the beam expander and the aperture stop.

Figure 12:
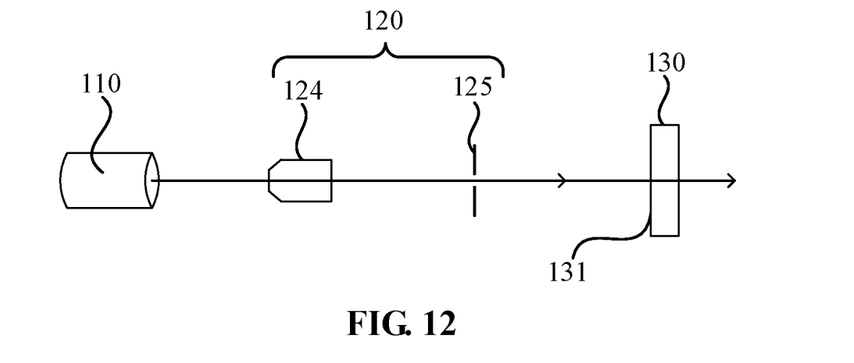
FIG. 12 is a schematic structural diagram of another display device according to an embodiment of the present invention.

FIG. 12 is a schematic structural diagram of another display device according to an embodiment of the present invention. Different from FIG. 10 and FIG. 11, in the embodiment of the present invention, as shown in FIG. 12, the spatial light modulator is a transmissive spatial light modulator. The light incidence surface 131 of the spatial light modulator 130 is perpendicular to the optical axes of the light source 110 and the filter 120. The light emitted from the light source 110 irradiates onto the spatial light modulator 130 through the light incidence surface 131. The light emitted by the light source 110 is filtered by the filter 120 and then irradiates onto the spatial light modulator 130 and still propagate along the optical axes of the light source 110 and the filter 120. The filter 120 includes a beam expander 124 and an aperture stop 125. It can be understood that the filter in the embodiment of the present invention may also be implemented by an attenuator, a spatial filtering plate and a collimating lens instead of the beam expander and the aperture stop. Generally, when using a reflective spatial light modulator as an element for phase modulation of light, it is necessary to ensure that the light is perpendicularly incident on the light incidence surface of the spatial light modulator or irradiates at a specific angle onto the light incidence surface of the spatial light modulator. However, when a transmissive spatial light modulator is used as an element for phase modulation of light, the need for the irradiation angle (i.e., the included angle between the incident light incident on the light incidence surface of the spatial light modulator and the light incidence surface) is low. In other words, the deviation of the irradiation angle is easier to be tolerated for the transmissive spatial light modulator, and the transmissive spatial light modulator does not change the propagation direction of the light incident thereon, which is beneficial to the optical path design.

What is claimed is:

1. A spatial light modulator comprising:
a substrate; and
a plurality of phase modulation devices disposed on a side of the substrate and arranged in an array,
wherein each of the plurality of phase modulation devices comprises a plurality of electrodes, the plurality of electrodes comprise at least one first electrode and at least one second electrode, the at least one first electrode and the at least one second electrode are alternately arranged in a direction departing from the substrate, and a piezoelectric layer is sandwiched between the first electrode and the second electrode; and
the piezoelectric layer comprises a piezoelectric material wherein each of the phase modulation devices comprises N first electrodes, wherein in each of the phase modulation devices, the first electrode closest to the substrate is a reflective electrode, the N−1 first electrodes other than the reflective electrode are transparent electrodes, all the second electrodes are transparent electrodes, the piezoelectric layer is a transparent piezoelectric layer, and the spatial light modulator is a reflective spatial light modulator.

2. The spatial light modulator according to claim 1, wherein
the at least one second electrode comprises a plurality of second electrodes; and
in at least one of the phase modulation devices, the N first electrodes are connected with each other, and the plurality of second electrodes are connected with each other.

3. The spatial light modulator according to claim 2, wherein
the first electrodes of the plurality of phase modulation devices respectively closest to the substrate are connected with each other.

4. The spatial light modulator according to claim 1, wherein
the piezoelectric material has a refractive index greater than two.

5. The spatial light modulator according to claim 1, wherein
the piezoelectric material comprises a piezoelectric single crystal, a piezoelectric polycrystalline ceramic, or an organic piezoelectric material.

6. A spatial light modulator comprising:
a substrate; and
a plurality of phase modulation devices disposed on a side of the substrate and arranged in an array,
wherein each of the plurality of phase modulation devices comprises a plurality of electrodes, the plurality of electrodes comprise at least one first electrode and at least one second electrode, the at least one first electrode and the at least one second electrode are alternately arranged in a direction departing from the substrate, and a piezoelectric layer is sandwiched between the first electrode and the second electrode; and
the piezoelectric layer comprises a piezoelectric material, wherein the first electrode and the second electrode are transparent electrodes, the piezoelectric layer is a transparent piezoelectric layer, and the spatial light modulator is a transmissive spatial light modulator.

7. The spatial light modulator according to claim 6, wherein
the at least one first electrode comprises a plurality of first electrodes, the at least one second electrode comprises a plurality of second electrodes; and
in at least one of the phase modulation devices, the plurality of first electrodes are connected with each other, and the plurality of second electrodes are connected with each other.

8. The spatial light modulator according to claim 7, wherein the first electrodes of the plurality of phase modulation devices respectively closest to the substrate are connected with each other.

9. A display device, comprising:

a spatial light modulator, a light source and a filter;

wherein the spatial light modulator comprises a substrate and a plurality of phase modulation devices disposed on a side of the substrate and arranged in an array, wherein each of the plurality of phase modulation devices comprises a plurality of electrodes, the plurality of electrodes comprise at least one first electrode and at least one second electrode, the at least one first electrode and the at least one second electrode are alternately arranged in a direction departing from the substrate, and a piezoelectric layer is sandwiched between the first electrode and the second electrode; and the piezoelectric layer comprises a piezoelectric material; and wherein the spatial light modulator is located at a side of the filter away from the light source, light emitted by the light source passes through the filter and then irradiates onto the spatial light modulator, and the spatial light modulator is configured to modulate a phase of the light irradiating thereon.

10. The display device according to claim 9, wherein the display device further comprises a beam splitter, a light incidence surface of the spatial light modulator is parallel to optical axes of the light source and the filter, and is at an angle of 45° to a transflective surface of the beam splitter, the light emitted by the light source passes through the light incidence surface and then irradiates onto the spatial light modulator, and the spatial light modulator is a reflective spatial light modulator;

The light emitted by the light source is filtered by the filter and then irradiates onto the transflective surface of the beam splitter, and then vertically irradiates onto the light incidence surface of the spatial light modulator after it is reflected by the transflective surface, and then again irradiates onto the beam splitter in a direction perpendicular to the optical axes of the light source and the filter after it is reflected by the spatial light modulator, and then passes through the transflective surface of the beam splitter to still propagate in the direction perpendicular to the optical axes of the light source and the filter.

11. The display device according to claim 9, wherein an included angle $\theta$ between a light incidence surface of the spatial light modulator and a direction of optical axes of the light source and the filter satisfies $0<\theta<90°$, wherein the light emitted by the light source is filtered by the filter and then irradiates onto the light incidence surface of the spatial light modulator, and the spatial light modulator is a reflective spatial light modulator;

the light emitted by the light source is modulated by the spatial light modulator, and then is reflected and still propagate along the direction which is at the included angle $\theta$ with respect to the light incidence surface.

12. The display device according to claim 9, wherein a light incidence surface of the spatial light modulator is perpendicular to optical axes of the light source and the filter, and the light emitted by the light source is filtered by the filter and then irradiates onto the light incidence surface of the spatial light modulator; and the spatial light modulator is a transmissive spatial light modulator; and the light emitted by the light source is modulated by the spatial light modulator, and then propagates along the direction the optical axes of the light source and the filter.

13. The display device according to claim 9, wherein the filter comprises an attenuator, a spatial filtering plate and a collimating lens.

14. The display device according to claim 9, wherein the filter comprises a beam expander and an aperture stop.

15. The display device according to claim 9, wherein the light source comprises a laser.

* * * * *